May 31, 1938. J. DE AYALA 2,119,455

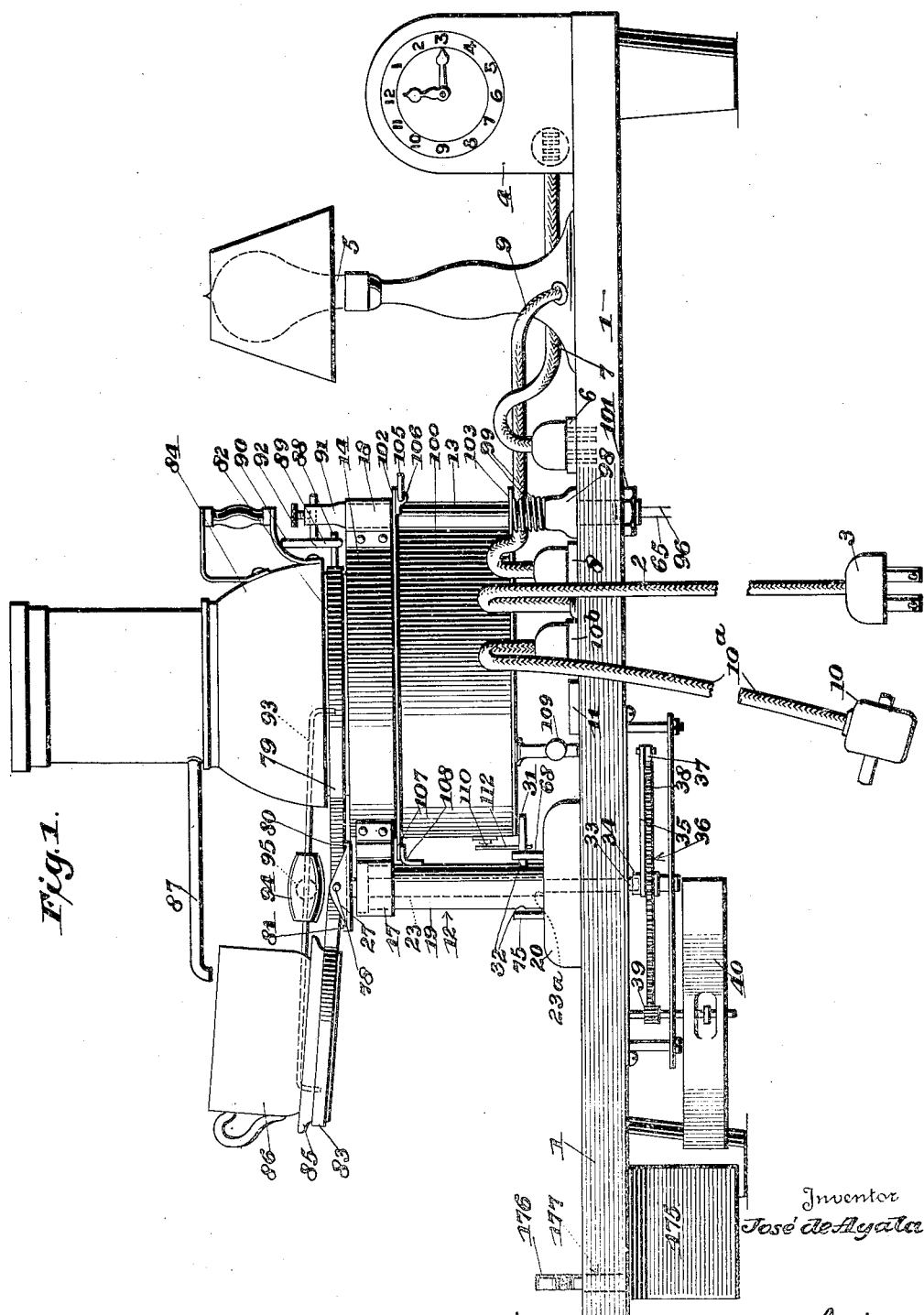

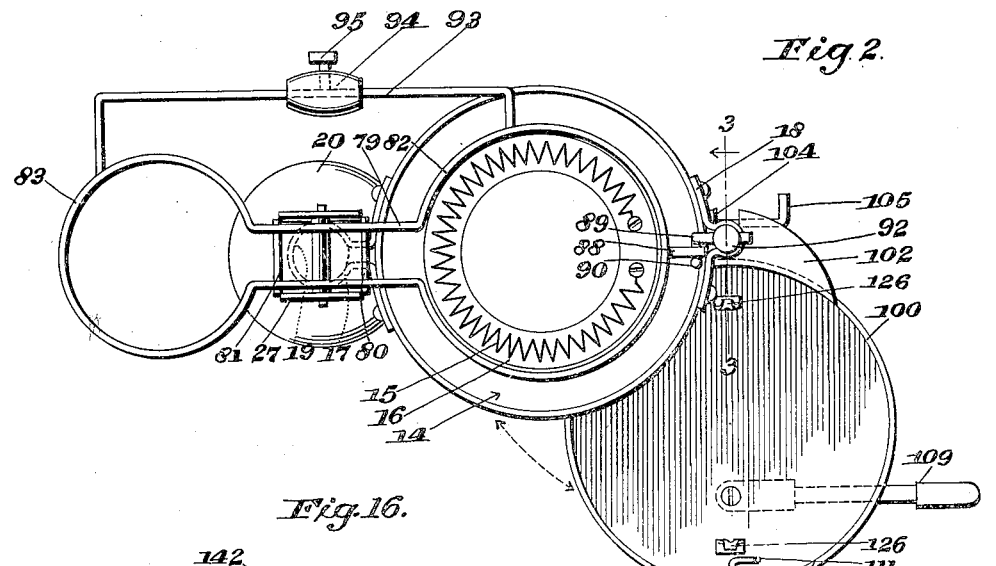
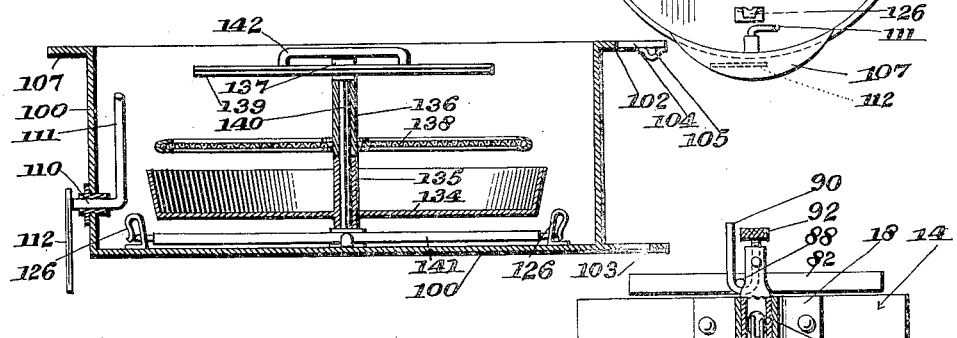
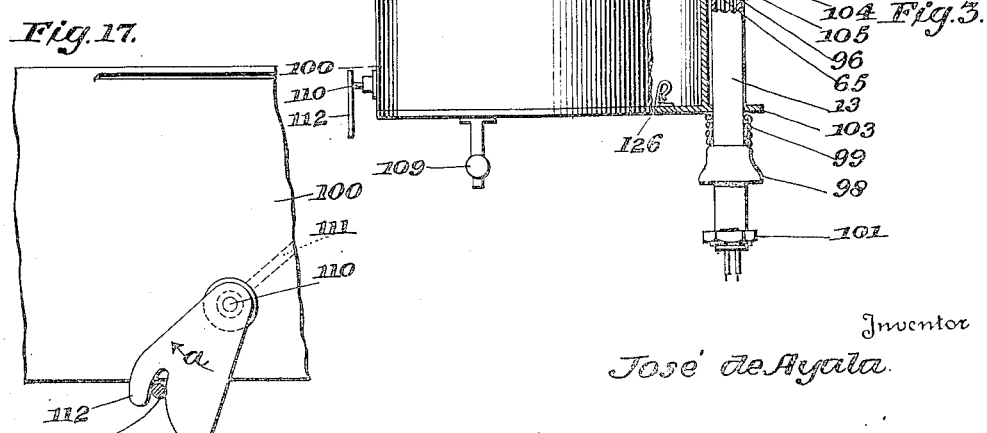

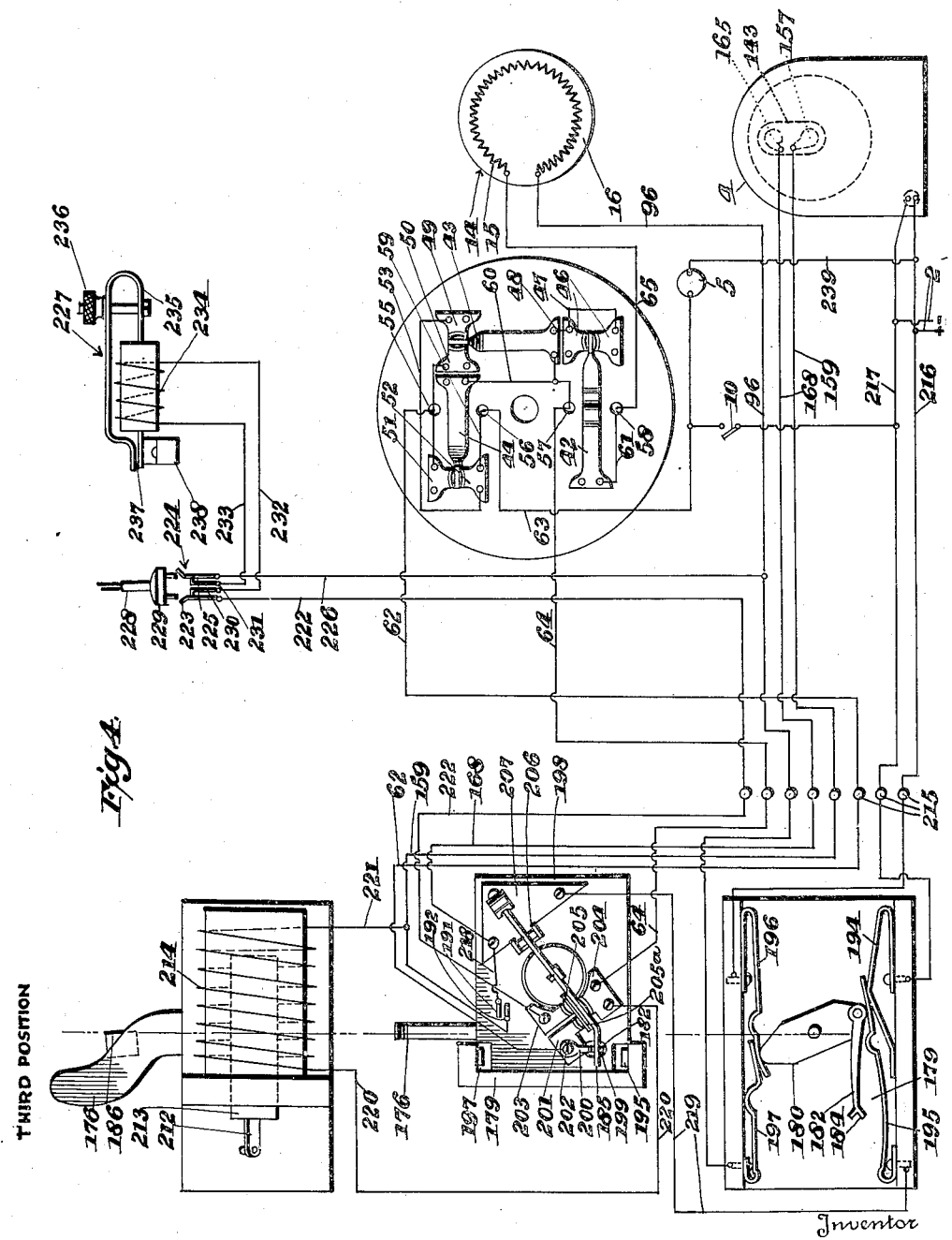

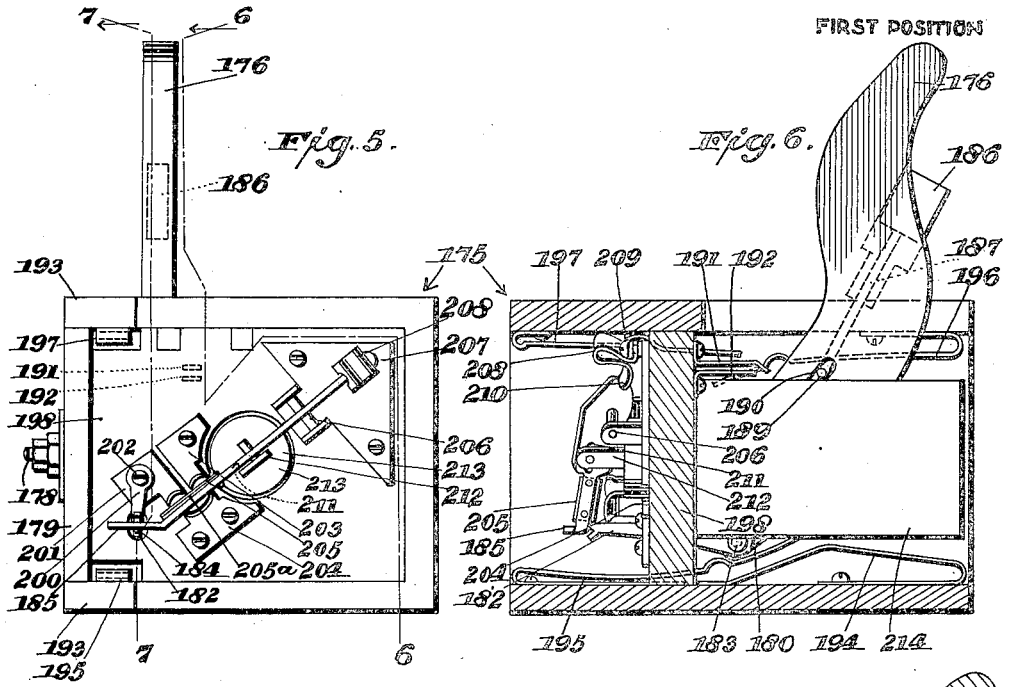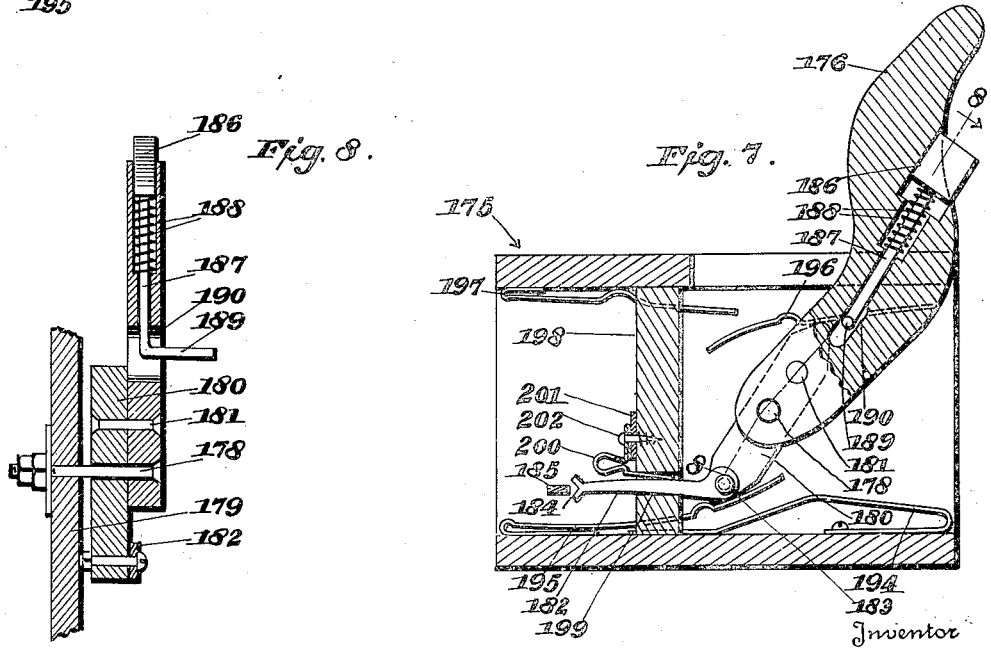

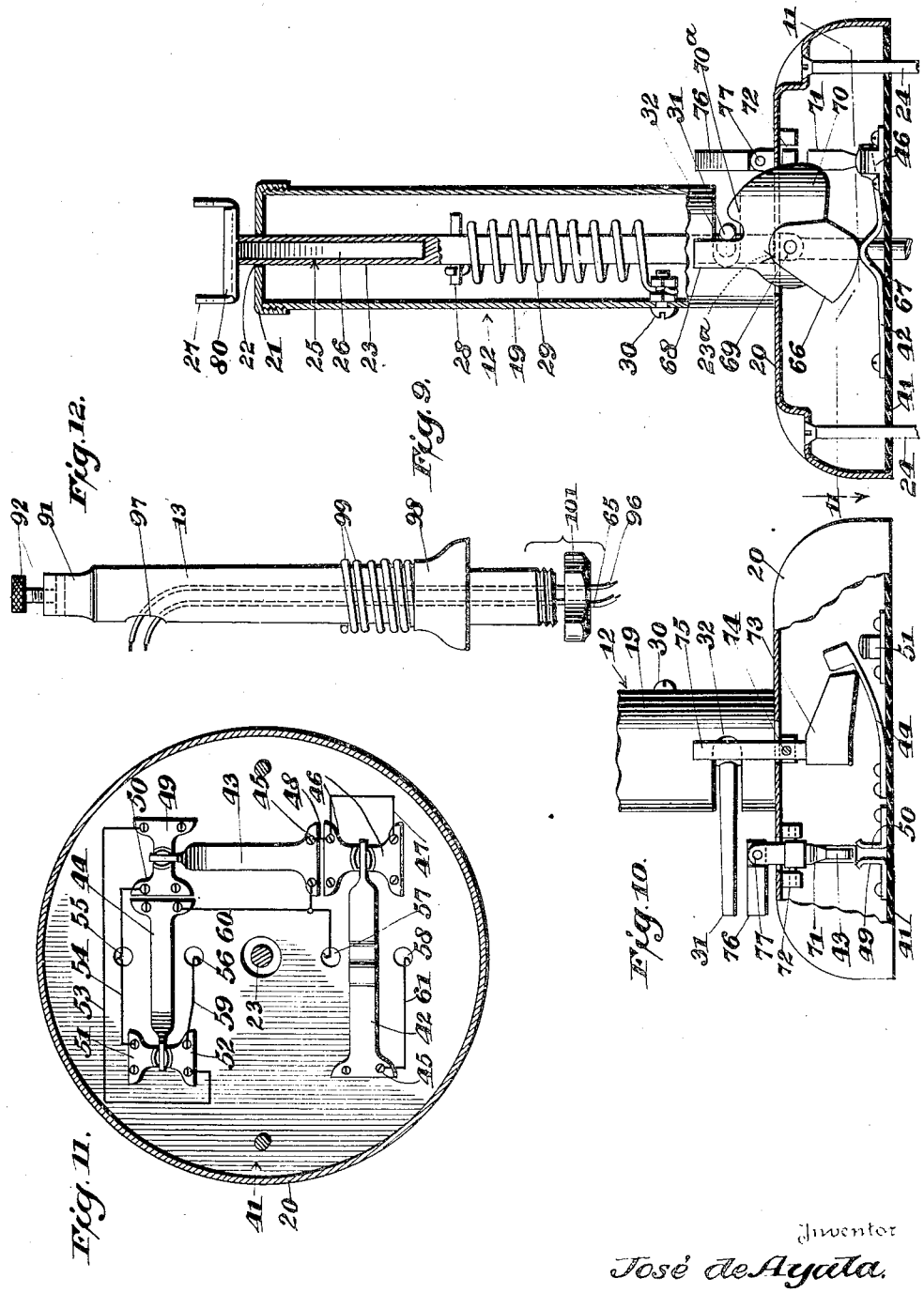

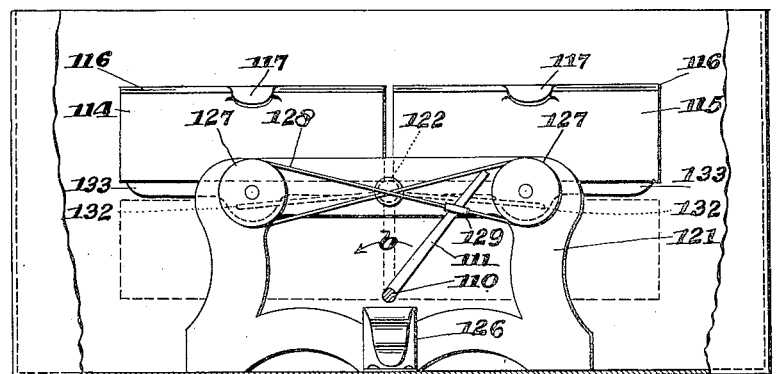
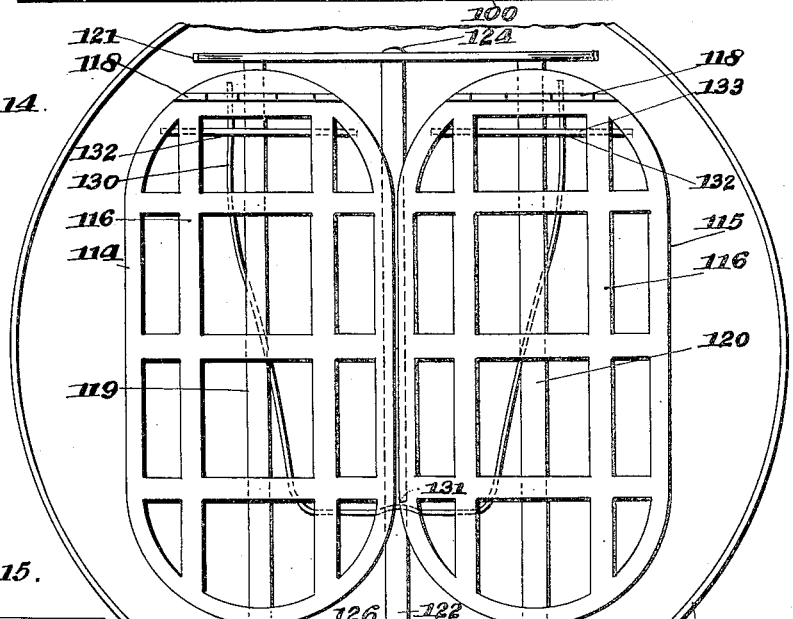
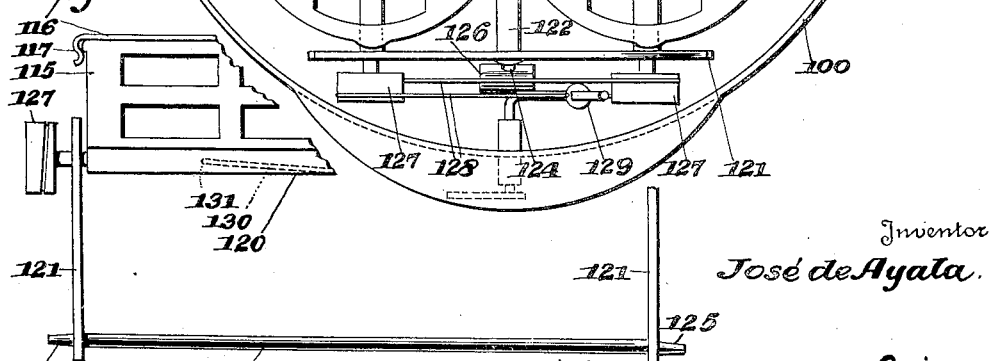

MEAL PREPARING APPARATUS

Filed Dec. 31, 1935 7 Sheets-Sheet 7

Inventor

José de Ayala.

By Munn, Anderson & Luddy

Attorney

Patented May 31, 1938

2,119,455

UNITED STATES PATENT OFFICE 2,119,455

MEAL PREPARING APPARATUS

José de Ayala, San Juan, P. R.

Application December 31, 1935, Serial No. 57,055

25 Claims. (Cl. 219—19)

This invention relates to improvements in meal preparing apparatuses, and its objects are as follows:—

First, to provide an apparatus for preparing a meal automatically to the extent of turning on the heat, moving at least one of the food elements, so to speak, away from the heat zone when done and finally turning off the heat so that the remaining food element or elements will not be over-done, all of the food elements previously being emplaced for cooking whereupon the mechanism is set for its automatic operation, as just explained, at a determined time.

Second, to manually emplace the food elements, for example the elements for breakfast, in the apparatus at a time, usually at night but not necessarily so, prior to the automatic cooking thereof on the following morning, the mechanism being set for the hour or fraction thereof when it is desired to have the preparation begin, there being a suitable alarm to awaken the sleeper for whom the meal is intended to be ready when he is ready for it.

Third, to use the apparatus for the preparation of a meal without the intervention of the time period which the setting of a clock involves, the apparatus then being caused to prepare the meal immediately after the last of the food elements is emplaced.

Fourth, to make the apparatus adaptable to preparing any desired part of a meal, not necessarily an entire meal, for example using said apparatus for the cooking of coffee only.

Fifth, to provide an electrical system for an apparatus of the foregoing kind, with means for so setting and controlling the apparatus as to carry out its functions automatically according to the will of the user.

In the drawings:—

Figure 1 is a side elevation of the improved meal preparing apparatus.

Figure 2 is a plan view of part of the apparatus shown in Figure 1, the coffee pot and cup being omitted, and the oven being swung out into a receiving position.

Figure 3 is a detail cross section of the oven, taken on the line 3—3 of Fig. 2.

Figure 4 is a diagrammatic view of the entire electrical system.

Figure 5 is a plan view of the manual control box.

Figure 6 is a cross section taken on the line 6—6 of Figure 5.

Figure 7 is a cross section taken on the line 7—7 of Figure 5.

Figure 8 is a detail sectional view taken on the line 8—8 of Figure 7.

Figure 9 is a central vertical section of the pedestal shown in Figure 1, the plane of the section being at a right angle, parts being in elevation.

Figure 10 is a detail sectional view of the base of the pedestal.

Figure 11 is a horizontal section taken on the line 11—11 of Figure 9.

Figure 12 is a detail view of the oven and heater standard.

Figure 13 is a cross section of the oven showing the toaster in place.

Figure 14 is a plan view of the oven, illustrating the toast cages more in detail.

Figure 15 is a detail side elevation of parts of the toaster frame.

Figure 16 is a sectional view of the oven, illustrating the use of a frying pan instead of the toaster.

Figure 17 is a fractional elevation of the oven, particularly illustrating the toast cage-turning finger later described.

Figure 19:
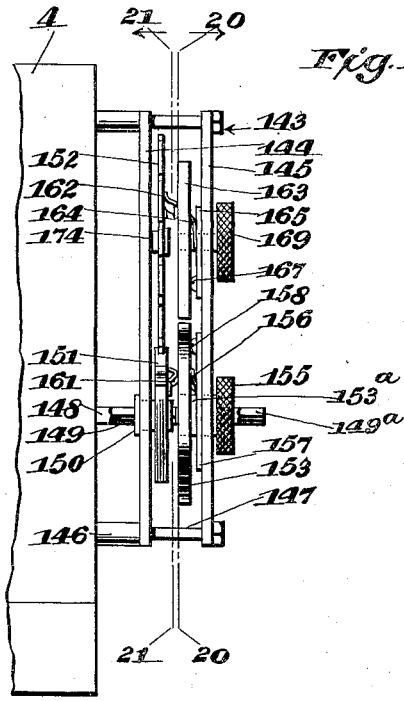
Figure 19 is a side elevation of the principal controlling mechanism of the clock.

As already set out in some detail in the foregoing statements of the objects of the invention, the latter is an electrical apparatus, intended to work on the ordinary alternating house current, for preparing breakfasts or other meals at a fixed hour and then waking up the person or persons who are to partake of them. In carrying out this invention provision is made of a base 1 (Fig. 1) which will be situated as the occasion may demand. For instance, it can be so arranged as to be part of a portable contrivance, not unlike a tray which can be carried from place to place, there being the provision of an electrical cord 2 with an attached plug 3 by which the apparatus is connected with an ordinary electrical outlet.

This base is preferably made large enough to carry an electrical clock 4 and a bed or table lamp 5 in addition to all of the mechanism of the meal preparing apparatus. The clock is removably connected with an electrical outlet 6 on the base by a 4-wire cord 7 through which current is supplied for the operation of the clock mechanism (not shown), and for a switch 143 (Fig. 4) which is operable by said clock mechanism. A similar electrical outlet 8 provides the place of connection of the 2-wire cord 9 of the lamp. The lamp is automatically switched on and off, as later described in connection with Figure 4, but the light can also be turned on and off separately by a manual switch 10 (Fig. 4) of any known kind. This switch is at one end of a conductor 10ª which reaches from the bedside where the switch is accessible, to a point of connection 10ᵇ on the base 1. The base 1, further, has a utility outlet 11 which does not serve any purpose excepting to provide a convenient place at which to obtain current for whatever purpose desired.

A pedestal 12 (Figs. 1 and 9) and a standard 13 (Fig. 1) provide the supports for an electrical heater 14. This heater includes the more or less usual resistance element 15 (Fig. 2) which is so incorporated in the insulating block 16 as to enable the heat to radiate both upwardly and downwardly when said element is energized by the closure of the heater circuit at a given setting of the clock 4. The casing of the heater has rigidly attached bands 17, 18 (Fig. 1) by which it is securely attached to the pedestal 12 and standard 13 as already indicated.

Referring now to the pedestal 12 for an understanding of its details, its tubular column 19 (Fig. 9) is fixedly centered upon a hollow base 20 which is permanently and firmly mounted on the apparatus base 1 as by the screws 24 shown in Fig. 9. The upper end of the column is closed by a cover 21 which is screwed into place, as shown. This cap has a central hole 22 in which the vertical shaft 23 turns. A reduction in the diameter of the shaft provides a shoulder 23ª (Figs. 1 and 9) which rests on the base 20 and thus supports the shaft and the weight of the balance, later described. A non-circular bore 25, extending only part way of the length of the shaft, loosely contains the correspondingly cross-sectionally shaped shank 26 of a bracket 27.

A cross pin 28 (Fig. 9) through the shaft 23 provides the anchorage for one end of a spring 29 which is loosely coiled around the shaft and has its other end anchored at 30 to the column 19. This spring is so tensioned as to turn the shaft 23 and its carried balance in the counter-clockwise direction, looking down. But this does not occur until the so-called balance is released.

An arm 31 (Fig. 9) is secured at one end to the shaft 23, and it extends out of the column through a semi-circular slot 32. This is a switch arm, and its purpose is to actuate one or more switches when the foregoing balance and consequently the shaft 23 are released for turning. The lower end of the shaft 23 is flattened at 33 to fit in the socket 34 on the arm 35 of a governor 36 (Fig. 1).

This governor regulates the turning of the shaft 23 and its carried parts, preventing too swift a motion by force of the spring 29. The arm 35 has a dog 37 which is in engagement with the teeth of a gear 38. This gear meshes with a pinion 39 which carries the wind vane 40. The counter-clockwise turn of the shaft 23 drives the vane and causes retardation as can readily be understood. Upon a clockwise turn of the shaft, as when restoring the balance (Fig. 1) to its operative position, the dog 37 merely drags over the teeth of the gear 38.

The switches just mentioned are contained by the base 20 (Fig. 11). This base includes a bottom 41 of insulating material. Movable contactors 42 and 43, 44 respectively known as the heater and lamp-ringer switches, are secured to the bottom 41. The switches 43 and 44 are virtual duplicates and serve the identical purposes of lighting the lamp and actuating the ringer. The contactor 42 has a pair of coacting contacts 46 which are electrically bonded at 47, the bond continuing to the contactor 43 by means of a short connection 48. The contactor 43 has a pair of coacting contacts separately designated 49, 50, and the contactor 44 has a similar pair of coacting contacts separately designated 51, 52. The contacts 49, 52 are bonded at 53. The contacts 50, 51 are bonded at 54, and this bond is connected to a wire which passes through a hole 55 which is one of a series of holes in the bottom 41 the remaining ones of which are designated 56, 57 and 58.

A wire 59 connects the contact 52 with the lamp 5 by means of an extension wire 63 which goes through the hole 56. A wire 62 commonly connects the contacts 50, 51 and is then passed through the hole 55 to the outside electrical system. A wire 60 commonly connects the contactors 43 and 44, its extension 64 passing through the hole 57. A wire 61 connects the contactor 42 with one side of the resistance element 15 by means of its extension 65 which goes through the hole 58.

Each of the foregoing movable contactors has an actuator which completes the respective switch. The actuator 66 (of insulating material) of the switch 42 (Fig. 9) is made in the form of a cam which is intended to ride against the projection 67 on the contactor 42 and move the contactor into engagement with the contacts 46 when the arm 31 is swung clockwise to the starting position (Fig. 1) at which time the arm presses back against the finger 68 of the actuator. The actuator is pivoted at 69, and has an enlarged side 70 which is formed into a cam point 70ª adjacent to the arm 31. The engagement of the arm 31 with the left side of the cam point turns the actuator 66 clockwise, so as to relieve the projection 67 of pressure by the actuator and permit the opening of the switch 42. Should the actuators happen to be placed in an erect position by hand so that the cam point 70ª stands in the path of the arm 31 when it is swung clockwise to its starting position, said arm will slide against the rounded part of the enlarged side 70 and depress the cam point to let the arm by. The arm then engages and moves the finger 68 so that the actuator assumes the position in Fig. 9.

The actuator 71 (of insulating material) of the switch 43 is pivoted at 72 at a place above the switch. The actuator 73 (of insulating material) of the switch 44 (Fig. 10) is similarly pivoted at 74 above said switch. The three actuators are 90° apart, corresponding with the position of the switches 42, 43, 44 (Fig. 11) which they operate. The actuators 71, 73 are alike in shape, resembling heels which, when the actuators are turned, bear down on the respective switches 43, 44 and cause them to engage the respective pairs of contacts.

The finger 75 (Fig. 10) of the actuator 73 is rigid, but the finger 76 of the contactor 71 has a joint 77 which enables the turning down of the free end of the finger, so that it will escape the arm 31 when swung around counter-clockwise. Figure 9 shows the finger 76 erect, and Figure 10 shows it turned down. The fingers 68, 75 (Figs. 9 and 10) stand in upright positions at the approximate extremities of the slot 32, an additional purpose of the finger 75 being to limit the counter-clockwise turning of the shaft 23 to 180° when engaged by the finger 31. The ends of the slot 32 are not intended to be engaged by the finger 31. These fingers are kept in the erect positions by the contactors 43, 44 which, being leaf spring, react against the actuators 71, 73 as long as the latter remain free.

A pin 78 pivotally connects the balance 79 and the bracket 27 (Figs. 1 and 2). The bracket has stops 80, 81 which limit the turning of the balance in either of its two directions. The balance consists of a mid part with nearly complete rings 82, 83 in the respective ones of which the coffee pot 84, constituting one receptacle, and the saucer 85 of a cup 86 are set. The coffee pot is of a special construction which is set out in detail in the co-pending patent application of José de Ayala, filed April 11, 1935, Serial No. 15,906, now Patent No. 2,072,199, of March 2, 1937.

Without going into minute details, the function of the coffee pot is briefly described as follows: It is arranged to contain separate quantities of cold water, milk and ground coffee. When the water is set to boiling by heat from the heater 14 (Fig. 2) the internal pressure forces the milk through a spout 87 (Fig. 1) into the cup 86, closely followed by the coffee infusion which is produced by the action of the boiling water on the ground coffee. Provision is also made for holding one or more eggs so that they will be cooked by the internal heat. As long as the foregoing contents remain in the pot 84 the preponderance of weight will be on the right end of the balance 79, but when the liquids are driven over into the cup 86, the added weight causes the balance 79 to tilt to the left with the following result:—

A projection 88 from the ring 82 (Fig. 1) fits in the crotch of a detent 89 which prevents the spring 29 (Fig. 9) from turning the balance 79 counter-clockwise. As soon as the liquid flows into the cup 86, as explained, the rocking of the balance displaces the projection 88 from the detent, thereby releasing the spring 29 for action in turning the balance counter-clockwise. The extent of turning can be either 90°, as when the finger 76 (Fig. 10) is erected into position to obstruct the arm 31, or 180° as when the finger 76 is lowered (Fig. 10), whereupon the finger 75 does the obstructing. In each case the coffee pot 84 is removed from the heater 14, preventing burning of the then virtually empty pot.

The detent 89 includes a rather tall end 90 which prevents turning the balance 79 so far in the clockwise direction as to carry the coffee pot 84 beyond the heater. The detent is secured to a boss 91 of the standard 13 by a screw 92 which, upon being loosened, will enable the making of any necessary adjustment of the detent with respect to the projection 88. A stiff wire 93 (Fig. 2), attached at its ends to the rings 82, 83, slidably carries a counterweight 94 which is adjustably set by the means 95 in the proper position along the wire so as to establish the proper equilibrium of the balance 79. The coffee pot will not always hold the same quantities of water, milk and ground coffee, and there will be times when the user varies the number of eggs to be cooked, whereupon the counterweight will be set to compensate for the variations.

Most of the standard 13 is hollow, being made in the form of a tube, thereby providing a conduit for the feed wires of the resistance element 15. One of these wires is 65, previously described in connection with Figure 4, the other 96 (Fig. 1). These wires leave the standard at an opening 97 (Fig. 12) which is situated at a point opposite to the heater 14. The standard has a shoulder 98 which rests on the top side of the base 1 and provides a stop for a spring 99, the purpose of which is to keep the oven 100 constituting another receptacle, pressed tightly upward toward the heater 14, which is situated intermediately of the two receptacles, said oven also being supported by the pedestal 12 and standard 13. A nut 101 (Fig. 1) on the threaded extension of the standard 13, binds against the nether side of the base 1 and firmly secures the standard.

The oven 100 is manually turnable with respect to the standard 13 which acts as a pivot. For this purpose the oven has hinge flanges 102, 103 (Fig. 1) which are notched at 104 (Fig. 2) to fit against the standard 13 so that the latter becomes a hinge pin. A latch 105, carried by a loop 106 underneath of the flange 102 at one side of the notch 104 is manually slidable across the notch into engagement with a keeper so as to hold the latch in a bridging position in back of the standard 13 and so retain the oven.

A similar latch can be mounted on the flange 103, but is here omitted because the spring 99, which presses against the flange 103, exerts pressure enough to keep this flange in place. A lip 107 (Figs. 1 and 2) on the side of the oven 100 opposite to the flange 102 is rested upon a bracket 108 on the pedestal 12 so as to prevent sagging of the oven and to complete its support as previously brought out.

A handle 109 is attached to the oven to provide a convenient means for manually swinging the oven out from under the heater 14 (Fig. 2). This is necessary to gain access to the interior for such purposes as emplacing and removing the toaster, frying pan, etc. The latch 105 is slid back only when it is desired to remove the oven 100 from the standard 13 for the purpose of cleaning.

A short shaft 110 (Fig. 16) is appropriately journaled in one side of the oven 100 so as to extend from the inside to the outside, the inner end of the shaft being bent at 111, the outer end carrying a cage-turning finger 112 (Fig. 17), which is made in the form of a hook to contain the arm 31 when the parts are in the starting position (Fig. 1). As the arm 31 begins its counterclockwise motion it tends to carry the finger 112 with it, thereby turning the shaft 110 in the direction $a$ (Fig. 17). When the apparatus is set the clockwise motion of the arm moves against the cam surface 113 of the finger, moving the finger.

The foregoing turning of the shaft 110 turns the toast-cages 114, 115 (Fig. 14) into either the up position (Fig. 13) or the down position (dotted lines). Each cage is of an open-work construction so that the heat can readily reach the bread contained thereby. The bread slices, when emplaced, are retained by open-work covers 116 (Fig. 13) which are latched down at 117 and hinged at 118 (Fig. 14).

Said cages are affixed to parallel shafts 119, 120. The shafts are journaled on the end pieces 121 of a toast frame which includes upper and lower spanner bars 122, 123. The ends of the bar 122 are riveted over at 124 (Fig. 14), but the ends of the bar 123 are extended and somewhat pointed as at 125 (Fig. 15) to facilitate engagement with holes in a pair of spring clips 126 riveted to the bottom of the oven 100 (Figs. 2 and 16). The spring clips retain the toast frame 121 in position, but upon desiring to remove the toast frame for the substitution of the frying pan (Fig. 16) the clips are readily displaced to release the bar 123.

Pulleys 127 (or their equivalents), are affixed to corresponding ends of the shafts 119, 120 (Figs. 13 and 14), and have steel wires 128 attached thereto in crossed positions. One of the wires has a ring 129 connected in it (Fig. 14), and the hole in this ring receives the bent end 111 of the shaft 110. When the shaft 110 is turned in the direction of arrow a (Fig. 17) at the commencement of counterclockwise motion of the arm 31 (Fig. 1) the end 111 is moved to the right position (Fig. 13) beginning to cause the cages 114, 115 to assume their up positions above the shafts 119, 120. When setting the apparatus, as previously pointed out, and correspondingly moving arm 31 against the cam surface 113 (Fig. 17), the resulting motion of the end 111 to the left (arrow b, Fig. 13) begins the reversal of the positions of the cages 114, 115, so that they are stationed in their down positions under the shafts 119, 120.

The extent of turning of the cages 114, 115 is 180°. The upper bar 122 chiefly serves as a stop bar. The corners of the cages engage the bar in both positions of the cages, limiting their turning to the 180° mentioned. A spring wire 130 of U-form (Fig. 14) is mounted at its bridge piece in a hole 131 in the bar 122. The free, spread ends of the wire occupy holes 132 in lugs 133 on the broad, closed sides of the cages. The holes 132 are so located as to come either below (Fig. 13) or above the shafts 119, 120, and since the spring action of the wire ends 130 is outward the cages will be snapped into position and held there. The bent end 111 merely initiates the turning of the cages; the spring wire 130 does the rest.

Mention was made of substituting the frying pan (Fig. 16) for the toaster (Fig. 14). It is thought to appear obvious that only one of these devices will and can be employed at one time. The same spring clips 126 are used. The frying pan 134 (Fig. 16) has a central tube 135 which, together with the central tubes 136, 137 of the screen and ventilating covers 138, 139, is slid in position on the center stem 140 of a pan frame 141. This frame is made in the form of a cross, the ends of the long center piece being somewhat pointed, as in the instance of the bar 123, to fit in the holes of the clips 126.

A handle 142 (Fig. 16) enables the adjustment of the size of the holes in the cover 139. This cover consists of two plates which are segmentally cut out like a familiar type of stove damper. The extent of registration of the cut-outs governs the amount of opening, and consequently of ventilation, through the cover. The pan 134 and screen cover 138 can be changed in position on the stem 140. When used as shown (Fig. 16), comparatively dry foods will be baked on the screen 138, any dripping falling into the pan 134. The screen and pan are reversed in position when it is desired to fry bacon, ham, eggs, etc., in which case the tube 136 supports the pan 134 in a desirably close position to the heater.

Mention has been made of the mechanism of the clock 4 not being shown. This will comprise any known electrical driving mechanism. Or it may consist of an even more familiar spring motor-driven mechanism. The purposes of the clock are to close an electrical circuit at a set time, and to hold the circuit closed for one minute.

Figure 18:
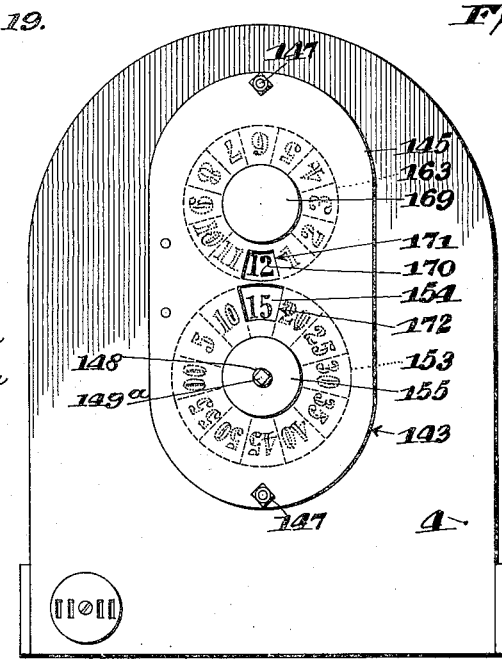
Figure 18 is a front elevation of the electrical clock which is generally used to control the system.
Figure 21:
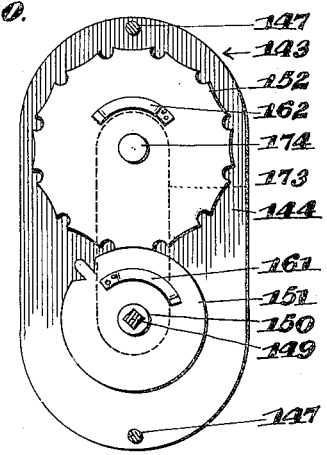
Figure 21 is a sectional view taken on the line 21—21 of Fig. 19.

For this purpose the clock is supplemented with a controlling mechanism 143 on back (Figs. 18 and 19). This comprises a pair of insulating plates 144, 145 which are spaced from the back of the clock as at 146 and from each other as at 147. The arbor 148 of the minute hand of the clock is extended through the mechanism 143. It has a squared portion 149 which carries an insulating bushing 150, and another squared portion 149a to receive a setting key. This bushing has the metallic drive disc 151 (Fig. 21) of an intermittent rotary motion affixed to it, the metallic driven disc 152 of said motion having twelve notches which are successively engaged by the single tooth of the drive disc.

Figure 20:
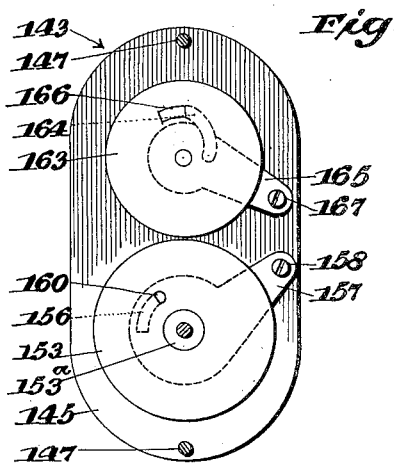
Figure 20 is a sectional view taken on the line 20—20 of Fig. 19.

An insulating wheel 153 (Fig. 19) having its outside plane face marked with minute numerals 154 (Fig. 18), increased by multiples of five, is affixed to the hub 153a of a thumb wheel 155 which is turnable on the arbor 148 and in a hole in the plate 145. Turning of the thumb wheel 155 turns the wheel 153 independently of the arbor 148. A contact spring 156 on the outer face of the wheel 153 is in permanent rubbing contact with a conductor plate 157. Said plate is secured at 158 on back of the plate 145 (Fig. 19), and it has a wire 159 (Fig. 4) connected to it. The contact spring 156 is so mounted on the wheel 153 that only a small end 160 (Fig. 20) is exposed on the reverse side.

This end is contactible for a period of one minute every hour by a contactor brush 161 (Fig. 21) on the confronting side of the drive disc 151. A similar contactor brush 162 (Fig. 21) bears against one plane face of an hour wheel 163 of insulating material, which has a contact spring 164 (Fig. 20) so fixed in it that the outer end continuously bears against a conductor plate 165, the portion next to the brush 162 being reduced to a small end 166 with which the brush is contactible for a period of one hour every twelve hours.

The conductor plate 165 is secured to the insulating plate 145 at 167, and a wire 168 (Fig. 4) is connected with said conductor plate. The shaft of the hour wheel 163 has a thumb wheel 169 for setting. The outer face of the hour wheel 163 has hour numerals 170 (Fig. 18), the various hour numerals showing at a window 171 in the plate 145. A similar window 172 shows the minute numerals 154. A metal plate 173 (Fig. 21) is embedded in the insulating plate 144 and provides a bearing for the bushing 150 and the stub shaft 174 (Fig. 19) of the driven disc 152.

There can be individual turning of the thumb wheels 155, 169 (Fig. 18). Turning of the thumb wheel 169 places the contactor end 166 (Fig. 20) in the hour-position desired, the wanted hour being indicated at the window 171. Turning of the knob 169 does not affect the driven disc 152, this being driven solely by the clockwork. Turning of the thumb wheel 155 sets the contact end 160 (Fig. 20) to the desired minute position of the wheel 153, the window 172 being watched for the indication.

Upon having set the control mechanism to 12.15, this setting merely being used for illustration, a mutual engagement of all of the contact ends and brushes will close the following partial circuit:—Current entering at plate 165 traverses the contact spring 164, small end 166, brush 162, metallic discs 152, 151, brush 161, contact end and spring 160, 156 and conductor plate 157. The destination of the wires 168, 159, which are involved in this partial circuit closure, is presently described. The duration of the circuit closure is one minute (or approximately so) this time being consumed in the passage of the brush 161 (Fig. 21) across the small end 160.

In addition to the mechanism 143 of the clock (Fig. 19), which controls the apparatus automatically after the mechanism is once set, there is also a manual control, and this is typified by control box 175 (Fig. 1). This box is preferably mounted on the underside of the base 1, and it has a lever 176 which projects through a slot 177 (Fig. 1) in the base to an accessible position on the top side. The lever is subject to being moved into any one of three positions, to wit: First, the idle position (Fig. 6) in which the apparatus is rendered inoperative for the purpose of cooking a meal, second the position in which the ringer (or phonograph) is stopped but the light is maintained burning, third the working position (Fig. 4) in which the apparatus is placed in readiness for operation at the time set at the clock 4.

The lever 176 is turnably mounted on a shaft 178 which is affixed to the back 179 (Fig. 8) of the box 175. The lever has a switch actuator 180 firmly attached to it by one or more rivets 181 or their equivalents. The lever and actuator commonly turn on the shaft 178, and the motion of the lever causes motion of the actuator. The latter has a pusher 182 pivotally connected with it at 183, the other and free end of the pusher being notched at 184 to engage the arm 185 of an automatic cut-out switch to the best advantage.

A switch button 186 (Figs. 6, 7), is readily made accessible by forming the lever 176 in the manner shown. The button 186 is in a somewhat secluded position so that the first tendency of the operator will not be to press the button 186, but rather to move the lever 176 into the desired one of its three positions. The purpose of the button 186 is to set the apparatus to work without the instrumentality of the clock 4. In other words, if the operator wishes to start the preparation of the meal ahead of time, that is to say, ahead of the time for which the clock is set, he will press the button 186 and initiate its operation.

The button 186 is affixed to a stem 187 (Fig. 8) which is slidably mounted inside of the lever 176. A spring 188 presses the button outwardly. A bend 189 in the free end of the stem 187 extends out of a slot 190 in the lever into a position from which a pair of contacts 191, 192 (Fig. 6) can be moved into engagement by a depression of the button 186 when the lever 176 is in the third position (Fig. 4).

Affixed to side pieces 193 (Fig. 5) which flank the long sides of the back 179 and project therefrom so as to provide supports are spring contacts 194, 195 and 196, 197 (Figs. 4 and 7). These contacts are paired off into two switches. Both switches are opened when the lever 176 is in the first position (Fig. 7). In the second position the contacts 194, 195 alone will be in engagement, and in the third position both pairs of contacts will be in engagement (Fig. 4).

A shelf 198 (Fig. 5) is included in the structure of the control box 175. This juts out from the back 179. It has an opening 199 which provides passage for the pusher 182 (Fig. 7). A spring leaf 200 extends into the opening 199 for the purposes of steadying the pusher 182 and to make electrical contact therewith. This leaf is secured to the shelf 198 in common with a plate 201 by a screw 202 (Fig. 4). A plate 203 is secured to the shelf 198 beside the plate 201 but in spaced relationship thereto. These plates, and a third plate 204, the latter also secured to the shelf, have upstanding parts which respectively are contacted by a bridge piece 205 and by the arm 185 which carries the bridge piece when the arm is in the switch-closing position. The bridge piece 205 is insulated from the switch arm 185 by a mica insert 205a.

This arm is part of what is hereinafter known as a solenoid-operated switch. The arm is pivoted at 206 (Figs. 4 and 5) to a plate 207 which is affixed to the shelf 198. A detent spring 208 tends to keep the arm 185 either in its up or down positions. For this purpose the spring 208 is adjustably mounted on the plate 207 as at 209 (Fig. 6), the free end of the spring engaging a notch 210 in the arm 185 so as to actuate the arm. The arm is in slotted connection (see the slot 211, Fig. 6) with an extension 212 of the core 213 (Fig. 4) of a solenoid 214. The only purpose of the solenoid is to close the switch which, for brevity, is designated by the numeral of the arm, namely 185.

Somewhere on the control box 175 there is emplaced a series of eight binding posts commonly designated 215 (Fig. 4). These are merely the points of connection between wires which lead from parts inside of the control box to other parts on the base 1. Since the wires inside of the control box and the corresponding wires on the outside are nothing more than extensions of each other the binding posts will not be mentioned again in the future description. In reading Figure 4 it should be understood that the control box 175 has been split, so to speak, into three parts, respectively showing the solenoid 214, the top of the shelf 198 and the pairs of switches on the back 179 in order that the various wires can be shown and traced more easily.

Mention was originally made of the electrical cord 2 (Fig. 1). This is a 2-wire cord which connects with conductors 216, 217. These are respectively connected with the contacts 196, 194. The wire 62, previously described in conjunction with the three pedestal base switches, connects the contacts 50, 51 (Fig. 4) of the latter with the spring leaf 200 and plate 201. The wire 159, previously described in conjunction with the control mechanism of the clock, connects its conductor plate 157 with the contact 192, the companion 191 of this contact, being connected with a wire 218 with the plate 207. Said plate is connected by the wire 168, also previously described in conjunction with the control mechanism of the clock, with the conductor plate 165 of said mechanism.

The wire 96, previously described in conjunction with the standard 13, connects one side of the heater resistance 15 with the contact 197. The remaining contact 195, of the pairs of contacts in the control box 175, is connected by a wire 219 to the plate 207. The wire 64, previously described in conjunction with the pedestal base switches, connects the wire 60 of the latter with the third plate 204. A wire 220 connects this plate with one side of the winding of the solenoid 214, the other side being connected to the wire 159 by a bridge wire 221.

A wire 222 connects the plate 203 with the contact 223 of a 4-point switch 224, the corresponding contact 225 being connected by a wire 226 with the previously mentioned wire 96. This switch enables the closure of a circuit either through the ringer 227 or through the motor of a phonograph (not shown). The latter has connected with it a 2-wire cord 228 which ends in a plug 229. When the plug is inserted in the switch 224 the ringer 227 will be cut out and the current will go through the phonograph motor, thereby to play the phonograph rather than to sound the ringer. The use of one or the other is optional with the person owning the apparatus.

For the purposes of the ringer the switch includes contacts 230, 231 which engage the contacts 223, 224 when the plug 229 is absent. The contacts 230, 231 have wire connections 232, 233 and the winding 234 of a magnet, the core 235 of which has an approximate U-shape. The flexible part of the core is adjustable at 236. The rigid part is affixed at 237 to a resonant wooden block 238. When the winding 234 is energized by the alternating current on which the apparatus is intended to work the resulting vibration of the free part of the core 235 will produce a ringing or buzzing sound, this depending on the nature of the block 238. In further reference to the lamp 5, its current is automatically switched on and off by the pedestal base switches, one of the wires 63 of the latter being connected with one side of the lamp, the other side of the lamp being connected by means of a wire 239 with the conductor 216.

The operation is as follows:—The apparatus is fixed in readiness for operation by pouring quantities of water, milk and ground coffee into the proper compartments of the pot 84 (Fig. 1), emplacing one or more eggs in the top of the coffee pot, all as clearly set out in the co-pending application, placing one or more slices of bread in the cages 114, 115 (Fig. 13) of the toaster, and setting the clock 4 (Fig. 1) to the time at which it is desired to have the apparatus automatically start the completion of the meal thus initially prepared. Slices of bread are placed in the toaster only in the event that it is desired to have toast for the meal. Otherwise the toast frame 121 will be replaced by the frying pan 134 (Fig. 16), and the frying pan will have laid into it such food as must be fried.

The setting of the clock 4 is subject to the choice of the user. The time 12.15 is given only as an example. The weight of the coffee pot 84, due to its contents, tilts the balance 79 toward the right. The counterweight 94 will be so adjusted as to establish a proper equilibrium of the balance. The latter is necessarily turned clockwise with its vertical shaft 23 until the coffee pot takes its position over the heater 14.

It cannot be turned any farther than this because the projection 88, after crossing the crotch of the detent 89, will be stopped by the tall end 90. The spring 29 (Fig. 9) is wound, and the detent holds the balance in position against the tension of this spring. The arm 31 takes its position in the cage-turning finger 112 (Figs. 1 and 17), and when taking this position does two things, first turns short shaft 110 (Fig. 16) in the direction of arrow b (Fig. 13) so that its bent end 111 actuates the wire 128 to turn the cages 114, 115 under to the dotted line position, second it moves the switch finger 68 over so that the actuator 66 (Fig. 9) closes the switch 42, 46, it being remembered that the cam point 70a functions only in case of the actuator 66 having been placed in the erect position (Fig. 9), then being worked by the approaching arm 31 to momentarily turn the actuator out of the way as previously described. This switch closes the circuit of the heater 14 at one of three points.

The other two closure points are in the controlling mechanism 143 (Fig. 4) of the clock and in the control box 175 (Fig. 4). Another act in the initial starting of the apparatus comprises moving the lever 176 of said control box to the third position (Fig. 4). This causes the switch actuator 180 to close both pairs of switches 194, 195 and 196, 197 (both pairs being heater switches). The automatic cut-out switch 185 is open, having been opened from an earlier movement of the lever 176 to the first position (Fig. 7), and staying open because of the action of the detent spring 208.

Assume that the clock indicates the time (12.15) for which the mechanism 143 (Fig. 4) is set. The third point of the heater circuit is now closed. Current flows through the heater resistance element 15 as follows: wire 217 (Fig. 4) which is connected to one side of the source of power, contacts 194, 195, wire 219, plate 207, wire 168 through the controlling mechanism 143, wire 159, wire 221, solenoid winding 214, wire 220, third plate 204, wire 64 to wires 60, 48 and 47, switch 42, 46, wires 61, 65, resistance 15, wire 96, contacts 197, 196 and wire 216 to the other side of the source of current. The energization of the solenoid 214 closes the switch 185, and is solely for that purpose, the switch arm 185 then engaging. The heater current is diverted to a partially new path which by-passes the solenoid winding and the control mechanism 143 so as to prevent raising a temperature therein. The partially new path is traced as follows: plate 207, switch arm 185, third plate 204 and wire 64.

The heat from the resistance 15 boils the water and browns one side of the bread. The coffee infusion automatically flows out of the spout 87 (Fig. 1) into the cup 86. This tilts the balance 79 to such an extent as to displace the projection 88 from the detent 89. The previously wound spring 29 now turns the balance 79 counter-clockwise either 90° or 180°. This optional turning is controlled by the setting of the finger 76 in the 90° position (Fig. 10). If this finger straightened (Fig. 9) it stops the arm 31 in the 90° position. If this finger is turned over (Fig. 10), the arm 31 will miss it and proceed to the 180° position before it is stopped by the finger 75 (Figs. 1 and 10).

The switches 43, 49 and 44, 51 (Fig. 11) of the respective fingers 76, 75 are for the identical purpose of turning on the lamp 5 and starting the ringer 227 (or the phonograph if plugged in at 229). Before tracing the lamp and ringer circuits it should be explained that the purpose of the depressible finger 76 and extra finger 75 (Fig. 10) is to permit the positioning of the cup 86 (Fig. 1) over the heater 14 if it is desired to insure the warmth of the coffee infusion. If the user expects to partake of the meal promptly after the preparation of the coffee infusion the balance 79 will be stopped in the 90° position. But if he expects to consume some time, as for example in taking a bath, the balance will be set for the 180° position, which will bring the cup 86 over the heater as explained.

Reverting to the release of the projection 88 (Fig. 1): As soon as the balance 79 starts to turn counter-clockwise the arm 31 turns the finger 112 in the direction of arrow a (Fig. 17), thus initiating the turning of the toast cages 114, 115. This turning is completed by the spring 130 (Fig. 14), and the cages turn 180° from the dotted to the full line positions (Fig. 13). The reverse sides of the slices are now brought next to the heater, and because of the heater current being turned off the cages are brought close to the heater so as to take advantage of the waning heat.

The heater current is turned off by the motion of the arm 31 against the cam point 70ª (Fig. 9), which is turned clockwise thereby to displace the actuator 66 and enable the contactor 42 to spring upwardly and open the heater circuit at 46. Assuming the finger 76 (Fig. 10) to have been erected, upon its being struck by the arm 31, the resulting depression of the contactor 43 into engagement with the contacts 49, 50 closes the following circuit: Current flows from one side of the source of current over wire 217, contacts 194, 195, wire 219, plate 207, switch arm 185, third plate 204, wires 64, 60 to contactor 43, contact 49, wire 53, contact 52, wires 59 and 63 to one side of the lamp 5, and from the other side of the lamp by way of wire 239 to the other side of the source of current.

Going back only far enough to trace the foregoing circuit from the switch arm 185, current from said arm passes to the spring leaf 200, plate 201, bridge piece 205, plate 203, wire 222, contacts 223, 230, wire 232, winding 234, wire 233, contacts 231, 225, wire 226, wire 96, contacts 197, 196 and wire 216 to the other side of the source of current, thus sounding the ringer.

Upon the awakening of the sleeping person by the sound of the ringer 227 (or by the playing of the phonograph), said person will move the lever 176 of the control box 175 from the previously mentioned third position to the second position if he desires to stop the ringer but keep the lamp 5 lighted. When in said second position the actuator 180 of the lever permits separation of the contacts 196, 197, thus breaking the ringer circuit, but maintaining closure of the contacts 194, 195, and maintaining the lamp circuit lighted over the following new circuit: wire 217, contacts 194, 195, wire 219, plate 207, switch arm 185, pusher 182, spring leaf 200, plate 201, wire 62, contact 51, switch 44, contact 52, wires 59, 63 to the lamp 5, then over wire 239 to the opposite side of the source of current at wire 216.

Still considering the lever 176 to be in its original third position (Fig. 4), the engagement of the finger 75 by the arm 31 (the finger 76 now being considered as having been depressed, as in Fig. 10) will close the switch 44 (Fig. 11) so that current from the switch arm 185 (flowing to the arm over the path already described) will flow to the plate 204, wires 64, 60 to the switch 44, thence through contact 52, over wires 59, 63 to the lamp 5 and over wires 239, 216 to the opposite side of the source of current. Current also flows from switch 44 through contact 51 over wire 62, plate 201, bridge piece 205, plate 203, wire 222, contacts 223, 230, wire 232, winding 234, wire 233, contacts 231, 225, wire 226, contacts 197, 196 and wire 216 to the opposite side of the source of current, thus operating the ringer 227.

Upon desiring to open the foregoing lamp circuit the operator places the lever 176 into the first position, the lamp circuit then opening at 185, 182 under pressure of the spring 208 (Figs. 5 and 6) against the switch arm 185. Said spring 208 snaps the arm 185 away from the pusher 182 so that the relative positions in Figs. 6 and 7 are assumed. However, this does not prevent relighting the lamp 5 by means of the switch 10 in Figure 1. Should the operator desire to start the operation of the apparatus ahead of the time for which the controlling mechanism 143 is set he will move the lever 176 to the third position (Fig. 4) and depress the button 186. The engagement of the contacts 191, 192, then in line with the bend 189 (Fig. 8) will close the following circuit: from one side of the source of current over wire 217, contacts 194, 195, wire 219, plate 207, wire 218, contacts 191, 192 (Fig. 4), wires 159, 221, solenoid winding 214 (the wires 159, 168 now being open in the clock mechanism 143), from solenoid 214 over wire 220 to the third plate 204, wire 64 to the heater 14 as before. The energization of the solenoid 214 closes the switch 185 and automatically cuts out the solenoid, still maintaining the heater current, as previously explained.

I claim:—

1. Meal preparing apparatus comprising a plurality of receptacles for a variety of comestibles in a state of partial preparation, a heater situated intermediately of the receptacles, a heat source for the heater, control mechanism to control the heat source having means which is set by choice to initiate the operation of said heat source at a given time and automatically stop said operation after a time-period has elapsed, and means in original equilibrium which carries one of the receptacles, said means being thrown out of equilibrium as the result of the heat from the heater on its contents to shift said means to remove its receptacle from proximity to the heater.

2. Meal preparing apparatus comprising a heater having a heat source which is adapted to be set in operation so as to throw off heat, control mechanism to start and stop the operation of the heat source, a balance and means by which it is turnably supported with respect to the heater, a pivot by which the balance is mounted on the turnable means, said balance being in original equilibrium when it carries an empty cup on that side of the pivot remote from the heater, and a coffee pot partly filled with water in position over the heater, said coffee pot having a spout reaching to the cup, means tending to turn the turnable means, and detent means preventing turning until the balance is shifted on its pivot and out of equilibrium by the transfer of the water to the cup due to the action of the heat.

3. Meal preparing apparatus comprising a heater having a heat source which is adapted to be set in operation so as to throw off heat, control mechanism to start and stop the operation of the heat source, means to carry in spaced relationship an empty cup and a coffee pot containing water there being a spout reaching from the pot to the cup, means pivotally and turnably supporting the previous means beside the heater and in the space between the cup and coffee pot, the weight of the water tilting said previous means down toward the heater so that the pot sets close to the heater when positioned thereover, and means to turn the turnable means when said previous means is tilted up from the heater on its pivotal means by a transfer of the water from the pot through the spout to the cup due to the action of the heat.

4. Meal preparing apparatus comprising a heater having a heat source which is adapted to be set in operation so as to throw off heat, control mechanism to start and stop the operation of the heat source, a tiltable and turnable balance pivoted beside the heater to carry on opposite sides of the pivot an empty cup and a coffee pot partly filled with water, said pot having a spout reaching to the cup, detent means to hold the balance in one tilted position with respect to the pivot when the coffee pot is disposed over the heater so that the water is subject to the heat, and means to turn the balance so as to displace the coffee pot from the heater when the balance is released from the detent means due to the tilting of the balance into a second position with respect to its pivot resulting from the transfer of the water from the coffee pot through the spout to the cup.

5. Meal preparing apparatus comprising a balance and a pivot on which it is tiltable, an empty cup and a coffee pot partly filled with water emplaced on the balance at opposite sides of the pivot, said pot having a spout directed into the cup, turnable means which carries the pivot and so supports the balance, a heater having a heat source toward which heater the balance tilts due to the weight of the water when the pot is positioned thereover so that the water is set to boiling by the heat, control mechanism to start and stop the operation of the heat source, a spring connected with the turnable means, and detent means retaining the balance in the boiling position and holding the spring under tension, the transfer of water from the pot to the cup due to boiling tilting the balance away from the heater and releasing it from the detent means so that the spring acts on the turnable means to displace the pot from over the heater.

6. Meal preparing apparatus comprising a balance and a pivot on which it is tiltable, an empty cup and a coffee pot partly filled with water emplaced on the balance at opposite sides of the pivot, said pot having a spout directed into the cup, turnable means which carries the pivot and so supports the balance, a heater having a heat source toward which heater the balance tilts due to the weight of the water when the pot is positioned thereover so that the water is set to boiling by the heat, control mechanism to start and stop the operation of the heat source, a spring connected with the turnable means, detent means retaining the balance in the boiling position and holding the spring under tension, the transfer of water from the pot to the cup due to boiling tilting the balance away from the heater and releasing it from the detent means so that the spring acts on the turnable means to displace the pot from over the heater, and means to variably limit the turning of the turnable means and consequently the displacement of the pot.

7. Meal preparing apparatus comprising a balance and a pivot on which it is tiltable, an empty cup and a coffee pot partly filled with water emplaced on the balance at opposite sides of the pivot, said pot having a spout directed into the cup, turnable means which carries the pivot and so supports the balance, a heater having a heat source toward which heater the balance tilts due to the weight of the water when the pot is positioned thereover so that the water is set to boiling by the heat, control mechanism to start and stop the operation of the heat source, a spring connected with the turnable means, detent means retaining the balance in the boiling position and holding the spring under tension, the transfer of water from the pot to the cup due to boiling tilting the balance away from the heater and releasing it from the detent means so that the spring acts on the turnable means to displace the pot from over the heater, and means to stop the turning of the turnable means when the cup comes into position over the heater.

8. Meal preparing apparatus comprising a balance and a turnable support which has a pivot on which the balance is tiltable, an empty cup and a coffee pot partly filled with water emplaced on the balance at opposite sides of the turnable support, said pot having a spout directed into the cup, a heater having a heat source over which heater the pot is originally positioned so that the water is set to boiling by the heat and thereby transferred to the cup, control mechanism to start and stop the operation of the heat source, and means which act because of the resulting tilting of the balance to turn the turnable means until the positions of the cup and pot are reversed with respect to the heater.

9. Meal preparing apparatus comprising a substantially horizontal balance and a vertical turnable support which has a horizontal pivot by which the balance is carried, an empty cup and a coffee pot partly filled with water emplaced on the balance in diametrically opposite positions with respect to the pivot, said pot having a spout directed into the cup, a heater having a heat source toward which heater the balance is tilted due to the weight of the water when the pot is positioned over the heater, control mechanism to start and stop the operation of the heat source, detent means which engage due to said tilting, resilient means held under tension by the detent means until the water is transferred from the pot to the cup due to tilting whereupon the balance is tilted away from the heater and from said detent means, and means to stop the balance at an approximately quarter turn of the turnable means.

10. Meal preparing apparatus comprising a heater having a heat source, control mechanism to start and stop the operation of the heat source, separate supports on opposite sides of the heater respectively for carrying a slice of bread and a pot containing water and ground coffee, the slice and pot being exposed to the heat to toast the bread and prepare the coffee infusion, and means acting upon completion of the infusion to simultaneously remove the pot support from proximity to the heater and to reverse the slice support.

11. Meal preparing apparatus comprising a heater having a heat source, controlling means for said source of heat, separate supports on opposite sides of the heater respectively for carrying a slice of bread and a pot containing water and ground coffee, the slice and pot being exposed to the heat to toast the bread and prepare the coffee infusion, means acting to move the pot support upon completion of the infusion to remove the pot from proximity to the heater, means responding to the movement of the pot support to actuate the controlling means to cut off the heat, and means also responding to the movement of the pot support to reverse the slice support and expose the opposite side of the slice to the residual heat in the heater.

12. Meal preparing apparatus comprising a heater having a heat source, control means to start and stop the operation of the heat source, a support on one side of the heater for a pot containing water and ground coffee, a second support on the opposite side of the heater for a slice of bread, said second support initially assuming the farthest away of two positions with respect to the heater, means acting upon the completion of the coffee infusion resulting from the heat to move the pot and remove the pot support from proximity to the heater, and means responding to the movement of the pot support to both reverse and move the slice support to the nearest of the two positions with respect to the heater at the same time.

13. Meal preparing apparatus comprising a heater and heat cut-off means, a toast cage situated on one side of the heater, supporting means and a shaft journalled on said supporting means, said shaft carrying the cage off center and being initially turned to dispose the cage in the farthest of two positions respecting the heater, pot supporting means on the other side of the heater, means to move the pot support so as to displace a pot carried thereby, and means responding to the movement of the pot support at the same time to cut off the heat at the cut-off means and turn the shaft and dispose the cage next to the heater and use the waning heat.

14. Meal preparing apparatus comprising a heater having a heat source, control mechanism to start and stop the operation of the heat source, a toast cage located on one side of the heater and containing a slice of bread having one surface exposed to the heat, means supporting an empty cup and a pot containing water on the other side of the heater, the pot being over the heater and having a spout directed into the cup, means acting to displace the supporting means when the water is forced into the cup by the heat so as to remove the pot from the heater, and means to then shift the toast cage so as to expose the opposite surface of the slice to the heat.

15. Meal preparing apparatus comprising a balance, turnable means on which the balance is pivoted intermediately of its ends, said balance being adapted to support an empty receptacle at one end and at the other end a second receptacle containing water, said second receptacle having a spout directed into the empty receptacle, a weight guide affixed to the balance and bridging the pivot means, a source of heat to which the second receptacle is exposed in an initial position, the heat driving the water through the spout into the empty receptacle preparatory to the turning of the turnable means and its carried balance, control mechanism to start and stop the heat, a pair of stops included in said turnable means, each limiting the tilting of the balance when the water occupies the respective receptacle, and a counterweight adjustably mounted on the weight guide so as to place the balance in equilibrium.

16. In meal preparing apparatus, a heater, a cut-off to control the heat, a toast cage situated on one side of the heater, supporting means and a shaft journaled on said supporting means, said shaft carrying the cage off center and being initially turned to dispose the cage away from the heater, a pot and means supporting the pot on the other side of the heater, means to move the pot support so as to remove the pot from over the heater, means at the same time to operate the heat control for cutting off the heat and start the turning of the shaft, and a spring then acting to complete the turning of the shaft to invert the cage and dispose it close to the heater.

17. Meal preparing apparatus comprising a heater having a heat source, control mechanism to start and stop the operation of the heat source, a pair of toast cages situated in proximity to the heater so that the heat can act on slices of bread contained by the cages, supporting means on which the cages are turnably mounted, means to initiate the turning of the cages when the slices are to be reversed with respect to the heater, and a spring permanently pressing upon the cages but acting when said turning is initiated to complete the turning of the cages.

18. Meal preparing apparatus comprising a heater having a heat source, control mechanism to start and stop the operation of the heat source, a pair of toast cages situated in proximity to the heater and adapted to contain bread slices which are to have their opposite sides exposed to the heater, supporting means on which the cages are turnably mounted, and means to turn the cages through 180° from a given setting with respect to the heater, said means comprising means to initiate the turning, a spring permanently pressing against the cages, acting when said turning is initiated to complete the turning of the cages, and a bar engaged by the cages to stop them at each end of their 180° of turning.

19. Meal preparing apparatus comprising a heater having a heat source control mechanism to start and stop the operation of the heat source, a pair of toast cages exposed to the heater, shafts carrying the toast cages, supporting means on which the shafts are journalled, pulleys on the shafts, means connecting the pulleys so that they can be turned in unison, said means having a ring, and a turnable shaft having a bent end fitted in the ring.

20. Meal preparing apparatus comprising a heater having a heat source, control mechanism to start and stop the operation of the heat source, an oven and a toast cage turnably supported therein, said cage being exposed to the heater and means to turn the cage with respect to the heater comprising a shaft journalled on the wall of the oven and having means associated with the inner end by which to do the turning, a finger on the outer end of the shaft, said finger having a hook form, and an arm turnably stationed beside the oven, said arm occupying the crotch of the hook and turning the finger when said arm turns away.

21. In meal preparing apparatus, a heater, separate supports exposed to the heater on opposite sides thereof respectively for carrying a slice of bread and a pot containing water and ground coffee, a controlling mechanism for a source of heat to the heater, said mechanism including the driven arbor of a lock by which said mechanism is carried, said mechanism further including settable contact means adapted to heat the heater at a set time when indicated by the clock, means acting upon the completion of the infusion due to the heat to remove the pot support from the heater, means acting with the movement of the pot support to cut off the heat from the heater, and means acting at the same time to reverse the slice support with respect to the heater.

22. In meal preparing apparatus, a heater including a resistance element, an electrical circuit embracing said element and having a source of current connected to it, means to support an article of food, said means being manually movable into a position of exposure respecting the heater, an arm which also moves when the movement of said supporting means occurs, an electrical switch then in the path of said arm to be closed by the manual effort in moving the supporting means, said switch being in the circuit and closing the circuit at one point, and at least one other switch in said circuit but being adapted for automatic operation, said switch including separated contacts, and a clockwork for bringing the contacts together at a set time, thereby to complete the closure of the circuit through said element.

23. In meal preparing apparatus, vessel supporting means and a turnable shaft by which said means is carried, a heater, ringer and lamp and means for turning the shaft with respect to the heater, an arm on the shaft traversing an arc of movement during turning of the shaft, a trio of switches for controlling the circuits embracing the respective heater, ringer and lamp, means at the approximate limits of movement of the arm both limiting the movements of the arm and controlling the respective remote switches, and means situated intermediately of the remote switches for controlling the intermediate switch, said means including a movable finger which is either moved to project into the path of the arm or moved out of said path to either stop the arm or let it pass over.

24. In meal preparing apparatus, a vessel support and a turnable shaft, a heater over which the support is disposed in one turned position of the shaft, a switch and an electrical circuit embracing said heater, means to turn the shaft so as to displace the support from the heater, and means to control the switch comprising an arm on the shaft, and an actuator pressing the switch into the closed position, a finger carried by the actuator and being engaged by the arm to hold the actuator in said position, and a cam point on the actuator engageable by said finger to remove the actuator from the switch when the arm departs from the finger upon said turning of the shaft.

25. In meal preparing apparatus, a heater including a resistance element, an electrical circuit embracing said element, a plurality of receptacles in proximity to the heater for a variety of comestibles in a state of partial preparation, a ringer and a lamp in said circuit, control mechanism having contacts which upon engagement complete the circuit through the element, ringer and lamp, and switch means in said circuit, being manually operative to break the circuit through the ringer but maintain the circuit through the lamp.

JOSÉ DE AYALA.